United States Patent
Choi et al.

(10) Patent No.: US 8,086,763 B2
(45) Date of Patent: Dec. 27, 2011

(54) CHANGING CLASS OF DEVICE

(75) Inventors: Moo-Rak Choi, Gyeonggi-Do (KR);
Kwang-Wook Lee, Gyeonggi-Do (KR);
You-Sun Kim, Gwangju (KR);
Sung-Jea Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 12/508,684

(22) Filed: Jul. 24, 2009

(65) Prior Publication Data

US 2010/0023649 A1  Jan. 28, 2010

(30) Foreign Application Priority Data

Jul. 25, 2008  (KR) ........................ 10-2008-0073078

(51) Int. Cl.
*G06F 3/00* (2006.01)
*G06F 1/24* (2006.01)
(52) U.S. Cl. .............. 710/14; 710/18; 710/315; 712/42; 712/43; 715/717; 715/718
(58) Field of Classification Search ......................... None
See application file for complete search history.

(56) References Cited

U.S. PATENT DOCUMENTS

| | | | |
|---|---|---|---|
| 7,760,232 B2 * | 7/2010 | Takashima | 348/207.1 |
| 2002/0101515 A1 * | 8/2002 | Yoshida et al. | 348/211 |
| 2003/0167376 A1 * | 9/2003 | Koh | 711/115 |
| 2006/0161701 A1 * | 7/2006 | Park | 710/63 |
| 2009/0221234 A1 * | 9/2009 | Pirzada et al. | 455/41.2 |

FOREIGN PATENT DOCUMENTS

KR   20070080451 A * 8/2007

* cited by examiner

*Primary Examiner* — Eron J Sorrell
*Assistant Examiner* — Dean Phan
(74) *Attorney, Agent, or Firm* — Fish & Richardson P.C.

(57) ABSTRACT

A class changing apparatus includes a link unit configured to be linked with a client device to transmit and receive data. The class change apparatus also includes a storage unit configured to store apparatus information including class information of the client device. The class changing apparatus further includes a control unit coupled to the link unit and the storage unit and controlling operations of the class changing apparatus including a class changing operation, wherein the class change operation includes transmitting at least one command including a command for rebranching into the selected class to the client device through the link unit and registering class information as changed class information in the storage unit in response to detecting a class change request.

21 Claims, 5 Drawing Sheets

CHANGING CLASS OF DEVICE

CROSS-REFERENCE TO RELATED APPLICATIONS

Pursuant to 35 U.S.C. §119(a), this application claims the benefit of priority to Korean Application No. 10-2008-0073078, filed on Jul. 25, 2008, the contents of which is incorporated by reference herein in its entirety.

FIELD

The present disclosure relates to changing class of device.

BACKGROUND

In general, when a client device such as a USB is linked to a host device, the host device registers the client device in its own registry through an enumeration process. At this time, the enumeration process begins when the host device is linked to the client device. Furthermore, when a link with the client device is sensed by the host device, it starts a real information exchange with the client device by sending a Get_Descriptor command to the linked client device. Furthermore, when the client device receives a Get_Descriptor command in response to that command, it transmits a Device_Descriptor signal including various information about the client device to the host device. The host device analyzes the transmitted Device_Descriptor signal to classify and recognize a function of the USB device based upon this signal.

Here, the function of a USB device is classified into several class functions as defined by the USB standard, and typical class functions of them are Mass Storage Class, Human Interface Class, Audio Class, Video Class, Communications Device Class, and the like. Each device supports at least one class function from among those various class functions, and when a device having at least two class functions is linked to a host, an enumeration operation is largely classified into two kinds.

The first type of enumeration operation recognizes each USB device that is linked with the host as a device having only one class function from among the class functions provided by the relevant device. For example, the client device is recognized as Mass Storage Class by performing an enumeration process, and then the client device is recognized only as Mass Storage Class even if other class functions are supported by the relevant device.

The second type of enumeration operation recognizes all of the class functions included in a USB device, registering each of them in the registry of a host device. As such, the functions provided by the USB device can be activated and utilized one-by-one.

SUMMARY

A class changing apparatus includes a link unit configured to be linked with a client device to transmit and receive data. The class changing apparatus also includes a storage unit configured to store apparatus information including class information of the client device. The class changing apparatus further includes a control unit coupled to the link unit and the storage unit and controlling operations of the class changing apparatus including a class changing operation, wherein the class change operation includes transmitting a class change command to the client device through the link unit and registering changes to class information stored by the storage unit in response to detecting a class change request.

Implementations may include one or more of the following features. For example, the class change request is received by the link unit from the client device. The control unit further determines whether or not the class change request is generated based upon a data type or data transmission method transmitted and received to and from the link unit.

The control unit determines whether or not the class change request is generated based upon a kind of application program implemented in engagement with the client device.

In some implementations, the control unit deletes existing class information registered in the storage unit in response to detecting a class change request. The link unit is a wired interface including a USB interface.

In some examples, the link unit is a wireless device. The changed class information is provided from the client device. And, the changed class information is a portion of a device-descriptor.

The class changing apparatus further includes the client device that receives the class change command from the control unit and sends the changed class information to the link unit.

In another aspect, a class changing apparatus includes a link unit configured to be linked with a client device to transmit and receive data. The class changing apparatus also includes a storage unit configured to store apparatus information including class information of the client device. The class changing apparatus further includes a control unit coupled to the link unit and the storage unit and controlling operations of the class changing apparatus including a class changing operation, wherein the class change operation includes transmitting at least one command including a command for rebranching into the selected class to the client device through the link unit and registering class information as changed class information in the storage unit in response to detecting a class change request.

Implementations may include one or more of the following features. For example, the class change request is received to the link unit from the client device. The control unit determines whether or not the class change request is generated based upon a data type or data transmission method transmitted and received to and from the link unit.

The control unit determines whether or not the class change request is generated based upon a kind of application program implemented in engagement with the client device.

In some implementations, the control unit deleting existed class information registered in the storage unit in response to detecting a class change request. The link unit is a wired interface including a USB interface. The changed class information is provided from the client device.

In some examples, the class changing apparatus further comprises the client device that receives the command for rebranching into the selected class from the link unit and sends the changed class information to the link unit.

In some implementations, at least one command includes a reset command. The class changing apparatus further includes the client device that receives the reset command from the link unit and resets the link between the client device and the link unit.

In yet another aspect, a method of changing a device class includes establishing a communication link between a host device and a client device based on class information. The method of changing a device class also includes detecting a class change request using a control unit of the host device. The method of changing a device class further includes transmitting a class change command to the client device through a link unit of the host device. In addition, registering a class information as changed class information in a storage of the host device.

Implementations may include one or more of the following features. For example, establishing a communication link between a host device and a client device based on class information includes sensing, by the host device, a link with the client device. Establishing the communication link also includes requesting, by the host device and from the client device, apparatus information. Establishing the communication link further include transmitting, by the client device in response to the request of the host device, apparatus information having the class information. In addition, establishing the communication link includes storing, in a storage unit, the apparatus information received by the host device, and selecting and implementing a device driver based upon the apparatus information.

In some implementations, detecting the class change request in the step (B) is based upon a data type or data transmission method transmitted and received between the host device and the client device, or based upon a kind of application program implemented in engagement with the client device in the host device. The class change command is a command by an ioctl (Input-Output-Control) interface.

In some examples, the method of changing a device class further includes resetting a communication link between the host device and the client device after transmitting the class change command to the client device and transmitting class information by the client device to the host device in response to the class change command.

In yet another aspect, a method of changing a device class includes establishing a communication link with a host device as Mass Storage Class by a client device. The method of changing a device class also includes generating a file transmission command in a streaming method by the host device. The method of changing a device class further includes determining whether or not Streaming Class is supported by the client device. In addition, the method of changing a device class includes reestablishing a link between the host device and the client device as Streaming Class based upon a determination that Streaming Class is supported by the client device.

Implementations may include one or more of the following features. For example, the method of changing a device class further includes dividing file data to be transmitted by the host device into a size of a buffer provided in the host device to load into the buffer when it is determined that Streaming Class is not supported by the client device and transmitting the data loaded into the buffer to the client device by the host device.

DETAILED DESCRIPTION

A class changing apparatus includes a control unit. The control unit, as a control means in charge of generally controlling the device class changing apparatus, controls a processing of command analysis, data computation, comparison, input and output, and the like.

When a link with a client device is sensed by the class changing apparatus, the control unit recognizes the client device to control a data input and output between those two devices.

Furthermore, the class changing apparatus includes a storage unit. Various data related to the operation of the class changing apparatus can be stored in the storage unit. For example, apparatus information for various client devices linked to the device class changing apparatus by the control unit is registered in the storage unit.

In addition, the class changing apparatus includes a link unit, and the link unit is a wired or wireless interface through which the client device is communication-linked with the device class changing apparatus. The link unit transmits data to the client device, or receives data from the client device based upon a command of the control unit.

When the link unit has a wired interface, the link unit is physically linked with the client device, and it may also include a communication port for providing an electrical contact point between those two device. At this time, the link unit may be a communication unit such as a USB (Universal Serial Bus) interface.

Furthermore, the link unit may have a wireless interface. In this case, it may include an antenna for transmitting and receiving a RF (Radio Frequency) signal, a RF module, and the like.

At this time, the client device can be linked with the class changing apparatus when the link unit supports the same communication method as a communication interface of the client device that is linked by the link unit.

Considering a concrete function of each constituent element in the class changing apparatus, the control unit first senses whether or not the client device is linked with the link unit.

When sensed that the client device is linked with the link unit, the control unit requests apparatus information to the client device to recognize the client device and set up a communication between those two devices.

Furthermore, when apparatus information of the client device is received by the link unit based upon a request for the apparatus information of the control unit, the apparatus information is stored in the storage unit to register the client device as an identified client device.

For example, the apparatus information may be a device-descriptor as defined in the USB standard if the client device is a device supporting a USB interface. The device-descriptor, as a descriptor for the client device, includes various information related to the device. In other words, the device-descriptor has information on the product and vendor IDs that are used for loading an appropriate driver used to drive a device, number of available system configurations that can be possessed by a device, and the like.

In addition, the apparatus information includes class information describing the attribute and function of the client device.

The class information is information provided by the client device to the class changing apparatus to notify whether or not the client device corresponds to any class among the prescribed kinds of classes between the class changing apparatus and the client device.

Various kinds of classes are defined in the USB interface standard, for example, Human Interface Device Class, Mass Storage Class, Audio Class, Video Class, and the like.

Here, the class information is provided to be included in the device-descriptor, or provided to be included in the interface-descriptor, which is a lower-level descriptor included in the device-descriptor. At least one interface-descriptor is included in the device-descriptor according to the USB interface standard.

When a plurality of interface-descriptors are included in the device-descriptor, the client device may provide a device-descriptor including all of a plurality of interface-descriptors to the class changing apparatus, or may provide a device-descriptor including one basically set interface-descriptor to the class changing apparatus.

Here, when a device-descriptor including a plurality of interface-descriptors is provided to the class changing apparatus, the class changing apparatus activates one interface-descriptor among them to establish a communication-link between the class changing apparatus and the client device.

Furthermore, when the class changing apparatus wants to use the client device as an another class function other than a function based upon the class information included in the activated interface-descriptors, the class changing apparatus may activate another of the interface-descriptor to establish a communication-link between the device class changing apparatus and the client device.

However, when a device-descriptor including such a plurality of interface-descriptors is provided to the class changing apparatus, the class changing apparatus registers all of the interface-descriptors in the storage unit (at this time, an area where the device-descriptor is stored will be the registry on the software).

Here, the registry is a database containing system information of all programs implemented on the operating system. For example, the database includes the kind of processor for the relevant system, capacity of main memory device, information on linked client devices, system parameters, file types and various parameters manipulated in an application software, and the like.

As a result, even though the client device provides a device-descriptor including a plurality of interface-descriptors to the device class changing apparatus, the control unit of the device class changing apparatus may select only one of them to register in the storage unit.

When the device-descriptor is registered in the storage unit for the first time after linking with the client device, it is possible to register only interface-descriptors including basic class information which has been set in advance in the storage unit.

Moreover, when desired to perform a function based upon the class information included in other interface-descriptors afterwards, the control unit requests a transmission of the relevant interface-descriptor to the client device and changes the interface-descriptor registered in the storage unit. Such a changing process will be described in detail later.

As described above, after receiving the apparatus information from the client device to register in the storage unit, the control unit reads information on the client device included in the apparatus information and drives an appropriate device driver.

Furthermore, it controls the client device and performs a data exchange using the device driver.

At this time, the device driver is a program routine for allowing an operating system of the device class changing apparatus to communicate with the client device, thereby controlling the client device.

Furthermore, the device driver is driven, thereby allowing the client device to perform a function corresponding to the class information registered based upon a control of the class changing apparatus.

At this time, when a request for changing a class of the client device is sensed, the control unit transmits a class change command to the client device through the link unit.

Here, the class change command may be a command by an ioctl interface. At this time, the ioctl is part of an interface for linking a computer user of basic operating system with a kernel. The ioctl, an abbreviation of "input/output control (I/O control), typically plays a role in helping codes in user space communicate with hardware devices and kernel configuration elements.

In other words, the request for changing a class is generated from an application program implemented in engagement with the client device, and therefore, a command should be transferred to a kernel area where the device driver is driven in user space, and it should be a command that can be interpreted even in the client device.

Accordingly, a class change command is transferred using an ioctl interface that can be interpreted even in various devices.

Here, the class change command includes a command for resetting a link between the class changing apparatus and the client device, and information on which is the class to be changed.

The link between the class changing apparatus and the client device is defined by the interface-descriptor, and it can be reset by an operating system of the client device.

Furthermore, in order to transmit the class change command, the control unit first senses whether or not there is a request for changing a class, and then selects the class to be changed to include it in the class change command.

First, it determines whether or not there is a request for changing a class based upon a kind of application program implemented in the class changing apparatus in engagement with the client device or a transmission method or type of data transmitted and received between the client device and the class changing apparatus.

In other words, for example, when the client device is written as Mass Storage Class in the class information within the apparatus information transmitted from the client device, the class changing apparatus recognizes the client device as Mass Storage Class to establish a communication-link. Furthermore, when a file transmission is carried out between those two device, the transmission method will be a download type.

However, when a command for performing a file transmission in a streaming type is inputted to the client device on an application program implemented in the class changing apparatus, the control unit determines such a command input as a class change request since the file transmission in a streaming type cannot be performed with a device recognized as Mass Storage Class.

As a result, the control unit generates, a command for requesting to change the class information of the client device such as from the Mass Storage Class to a class capable of performing the file transmission in a streaming type, to the client device.

Here, the control unit selects a class to be changed from the class of the client device among various classes defined in the standard. In case as shown above, the class should be changed to a class capable of performing the file transmission in a streaming type, and therefore, Audio or Video Streaming Class can be selected as the class to be changed.

The control unit transmits the class change command, including information on which is the class to be changed and a command for resetting a link between the class changing apparatus and the client device, to the client device through the link unit.

Furthermore, when new class information is received from the client device in response to such a command, the control unit deletes the class information on the client device which has been stored in the storage unit as Mass Storage Class, and then changes the class information on the client device to Audio or Video Streaming Class to register in the storage unit.

Furthermore, when the class information on the client device is changed and registered in the storage unit in such a way, the class changing apparatus recognizes the client device as a changed class, thereby performing a function corresponding to the changed class.

However, when a class change command is transmitted from the class changing apparatus to the client device, but the new class information included in the class change command is not received from the client device, for example, when a command for changing to Streaming Class is transmitted, but data including Mass Storage Class information is received again from the client device, the control unit determines that the client device cannot support Streaming Class and recognizes Mass Storage Class information as Mass Storage Class.

As an another implementation, a class changing apparatus has a host device and a client device for changing a device class, are configured to include a host device for deleting the class information registered in the storage unit, and transmitting a class change command to the client device through the link unit when a class change request of the client device is generated, and a client device for resetting a link with the host device, and retrieving class information included in the class change command to transmit to the host device when the class change command is transmitted.

Figure 1:
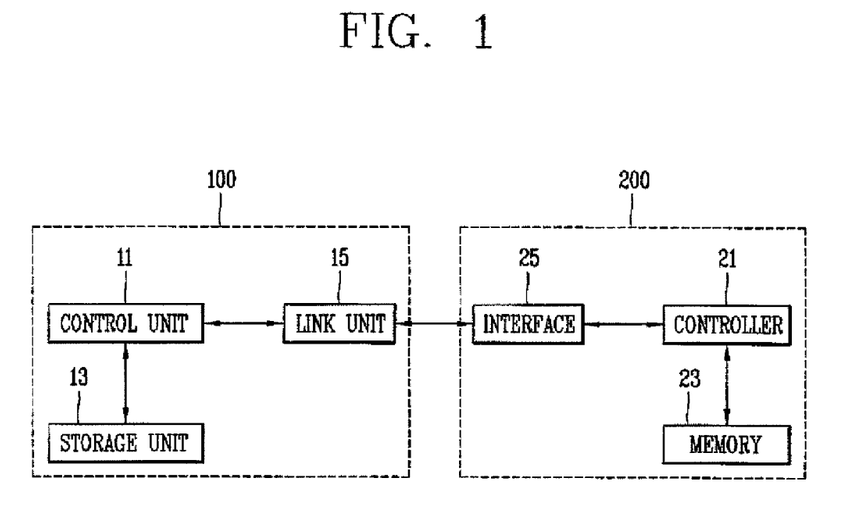
FIG. 1 is a block diagram illustrating a schematic configuration of showing a class changing apparatus.

Referring to FIG. 1, a host device 100 is a device performing a central role in processing data processing requests from all linked devices in a centralized information processing system. Furthermore, a client device 200 is a device that is linked to the host device 100 and subject to a control of the host device 100.

The host device includes a control unit 11. The control unit 11 is in charge of generally controlling the host device 100, such as controls a processing of command analysis, data computation, comparison, input and output, and the like.

When a link with a client device 200 is sensed or detected by the host device 100, the control unit 11 recognizes the client device 200 to control a data input and output between those two devices.

Further, the host device 100 includes a storage unit 13. Various data related to the operation of the host device 100 can be stored in the storage unit 13. For example, in the storage unit 13, apparatus information for various client devices linked to the host device 100 controlled by the control unit 11 is registered.

In addition, the host device 100 includes a link unit 15, and the link unit 15 can be a wired or wireless interface so that the client device 200 is communication-linked with the host device 100. The link unit 15 transmits data to the client device 200, or receives data from the client device 200 based upon a command of the control unit 11.

When the link unit 15 uses a wired interface, the link unit 15 is physically linked with the client device 200, and it may include a communication port that provides an electrical contact point between those two devices. A USB (Universal Serial Bus) interface is an example of the link unit 15.

Furthermore, in case that the link unit 15 may use a wireless interface, the link unit 15 includes an antenna for transmitting and receiving a RF signal, a RF module, and the like.

The client device 200 can be communication-linked with the host device 100 when the link unit 15 supports the same communication method. The control unit 11 first senses or detects whether or not the client device 200 is linked with the link unit 15.

When the control unit 11 sensed or detected that the client device 200 is linked with the link unit 15, the control unit 11 requests apparatus information to the client device 200 to recognize the client device 200 and start a communication between those two devices. The client device 200 provides the apparatus information to the host device based upon the request, and the link unit of the host device 100 receives apparatus information of the client device 200. The apparatus information is then stored in the storage unit 13 to register the client device 200.

In this implementation, the apparatus information may be a device-descriptor as defined in the USB standard if the client device 200 is a device supporting a USB interface. The device-descriptor, as a descriptor for the client device 200, includes various information related to the device. For example, the device-descriptor has information on the product and vendor IDs that are used for loading an appropriate driver used to drive a device, number of available system configurations that can be possessed by a device, and the like.

The apparatus information also includes class information describing the attribute and function of the client device 200.

The class information is information provided by the client device 200 to the host device 100 to notify whether or not the client device 200 corresponds to any class among the prescribed kinds of classes between the host device 100 and the client device 200.

Various kinds of classes are defined in the USB interface standard, and typical examples are Human Interface Device Class, Mass Storage Class, Audio Class, Video Class, and the like.

Here, the class information is provided to be included in the device-descriptor, or provided to be included in the interface-descriptor, which is a lower-level descriptor included in the device-descriptor.

At this time, at least one interface-descriptor is included in the device-descriptor according to the USB interface standard.

When a plurality of interface-descriptors are included in the device-descriptor, the client device 200 may provide a device-descriptor including all of a plurality of interface-descriptors to the host device 100, or may provide a device-descriptor including one basically set interface-descriptor to the host device 100.

Here, when a device-descriptor including a plurality of interface-descriptors is provided to the host device 100, the host device 100 activates a basically set interface-descriptor of them to establish a communication-link between the host device 100 and the client device 200.

Furthermore, when desired to use the client device 200 as an another class function other than a function based upon the class information included in the activated interface-descriptor, the host device 100 may activate another interface-descriptor to establish a communication-link between the host device 100 and the client device 200.

However, when a device-descriptor including such a plurality of interface-descriptors is provided to the host device 100, the host device 100 registers all of them in the storage unit 13 (at this time, an area where the device-descriptor is stored will be the registry on the software).

Here, the registry is a database containing system information of all programs implemented on the operating system. Stored are the kind of processor for the relevant system, capacity of main memory device, information on linked client devices, system parameters, file types and various parameters manipulated in an application software, and the like.

As a result, even though the client device 200 provides a device-descriptor including a plurality of interface-descriptors to the host device 100, the control unit 11 of the host device 100 may select only one of them to register in the storage unit 13.

When the device-descriptor is registered in the storage unit 13 for the first time after linking with the client device 200, it is possible to register only interface-descriptors including basic class information (e.g., a default) which has been set in advance in the storage unit 13.

Moreover, when desired to perform a function based upon class information included in other interface-descriptors afterwards, it requests a transmission of the relevant interface-descriptor to the client device 200 and changes the interface-descriptor registered in the storage unit 13. Such a changing process will be described in detail later.

As described above, after receiving the apparatus information from the client device 200 to register in the storage unit 13, the control unit 11 reads information on the client device 200 included in the apparatus information.

At this time, when a request for changing a class of the client device 200 is sensed, the control unit 11 transmits a class change command to the client device 200 through the link unit 15.

Here, the class change command may be a command by an ioctl interface. At this time, the ioctl is part of an interface for linking a computer user of basic operating system with a kernel. The ioctl, an abbreviation of "input/output control (I/O control), typically plays a role in helping codes in user space communicate with hardware devices and kernel configuration elements.

In other words, the request for changing a class is generated from an application program implemented in engagement with the client device 200, and therefore, a command should be transferred to a kernel area where the device driver is driven in user space, and it should be a command that can be interpreted even in the client device 200.

Accordingly, a class change command is transferred using an ioctl interface that can be interpreted even in various devices.

Here, the class change command includes a command for resetting a link between the host device 100 and the client device 200, and information on which is the class to be changed.

The link between the host device 100 and the client device 200 is defined by the interface-descriptor, and it can be reset by an operating system of the client device 200.

In order to transmit the class change command, the control unit 11 first senses or detects whether or not there is a request for changing a class, and then selects the class to be changed to include it in the class change command.

First, it determines whether or not there is a request for changing a class based upon a kind of application program implemented in the host device 100 in engagement with the client device 200 or a transmission method or type of data transmitted and received between the client device 200 and the host device 100.

In other words, for example, when the client device 200 is written as Mass Storage Class in the class information within the apparatus information transmitted from the client device 200, the host device 100 recognizes the client device 200 as Mass Storage Class to establish a communication-link. Furthermore, when a file transmission is carried out between those two device, the transmission method will be a download type.

However, when a command for performing a file transmission in a streaming type is inputted to the client device 200 on an application program implemented in the host device 100, the control unit 11 determines such a command input as a class change request since the file transmission in a streaming type cannot be performed with a device recognized as Mass Storage Class.

As a result, the control unit 11 generates, a command for requesting to change the class information of the client device 200 from the Mass Storage Class to a class capable of performing the file transmission in a streaming type, to the client device 200.

Here, the control unit 11 selects which will be a class to be changed from the class of the client device 200 among various classes defined in the standard. In case as shown above, the class should be changed to a class capable of performing the file transmission in a streaming type, and therefore, Audio or Video Streaming Class is selected as the class to be changed.

The control unit 11 transmits the class change command, including information on which is the class to be changed and a command for resetting a link between the host device 100 and the client device 200, to the client device 200 through the link unit 15.

Furthermore, when class information to be changed is received from the client device 200 in response to such a command, the control unit 11 deletes the class information on the client device 200 which has been stored in the storage unit 13 as Mass Storage Class, and then changes the class information on the client device 200 to Audio or Video Streaming Class to register in the storage unit 13.

Furthermore, when the class information on the client device 200 is changed and registered in the storage unit 13 in such a way, the host device 100 recognizes the client device 200 as a changed class, thereby performing a function corresponding to the changed class.

However, when a class change command is transmitted from the host device 100 to the client device 200, but class information corresponding to the class information to be changed included in the class change command is not received from the client device 200, for example, when a command for changing to Streaming Class is transmitted, but data including Mass Storage Class information is received again to the client device 200, the control unit 11 determines that the client device 200 cannot support Streaming Class and recognizes Mass Storage Class information as Mass Storage Class.

On the other hand, the client device 200 includes a controller 21 for a class change operation of the host device 100. The controller 21 functions to process data that is received to the client device 200, and perform a command.

In addition, the client device 200 includes a memory 23. Various data can be stored in the memory 23. In particular, apparatus information related to the client device 200 is stored in the memory 23.

The apparatus information is provided to the host device 100, and allows the host device 100 to recognize the client device 200 thereby transmitting and receiving data to and from each other.

The apparatus information as described above may be a device-descriptor as defined in the USB interface standard. Furthermore, a structure of the device-descriptor may be configured by including at least one interface-descriptor as a lower-level descriptor thereof as stated above.

The device-descriptor or the interface-descriptor includes at least one class information of the client device 200.

Furthermore, when the client device 200 is linked with the host device 100, the controller 21 provides apparatus information stored in the memory 23 to the host device 100 based upon a request of the host device 100.

At this time, if the apparatus information is the device-descriptor, then the controller 21 may transmit all the class information together included in the device-descriptor to the host device 100, or may transmit only the information of the class that has been set to basic class of them by including in the device-descriptor.

Otherwise, if at least two interface-descriptors are included in the device-descriptor, then the controller 21 may transmit only some of them by including in the device-descriptor.

On the other hand, the client device 200 includes an interface 25. The interface 25 allows the client device 200 to establish a communication-link with the host device 100, and can be provided with a wired or wireless interface, and also it supports the same communication standard as a link unit of the host device 100.

Briefly describing an operation of the client device 200, the interface 25 is linked with the link unit 15, and then the controller 21 is requested to provide apparatus information by the host device 100.

Furthermore, based upon the request, the controller 21 reads the apparatus information of the client device 200 from the memory 23 to transmit to the host device 100 through the interface 25.

At this time, the controller 21 transmits the apparatus information by including at least one class among the classes supported by the client device 200.

Then, the controller 21 controls the client device 200 based upon a control of the host device 100.

On the other hand, if the client device 200 receives a class change command from the host device 100 through the interface 25 while functioning based upon a control of the host device 100, then the controller 21 resets a link between the host device 100 and the client device 200 based upon a command of the host device 100.

At this time, the reset of a link between those two devices may be a software reset that is supported by an operating system of the client device 200.

Furthermore, the controller 21 reads class information to be changed, which is included in the class change command, to transmit to the host device 100.

At this time if the apparatus information is a device-descriptor as defined in the USB interface standard, then the controller 21 may retrieve the interface-descriptor including the class information to be changed, which is included in the class change command, from the memory 23 to transmit the relevant interface-descriptor to the host device 100.

However, if class information corresponding to the class information to be changed, which is included in the class change command, is not included in the memory 23, then the controller 21 may transmit prescribed basic class information to the host device 100.

Figure 2:
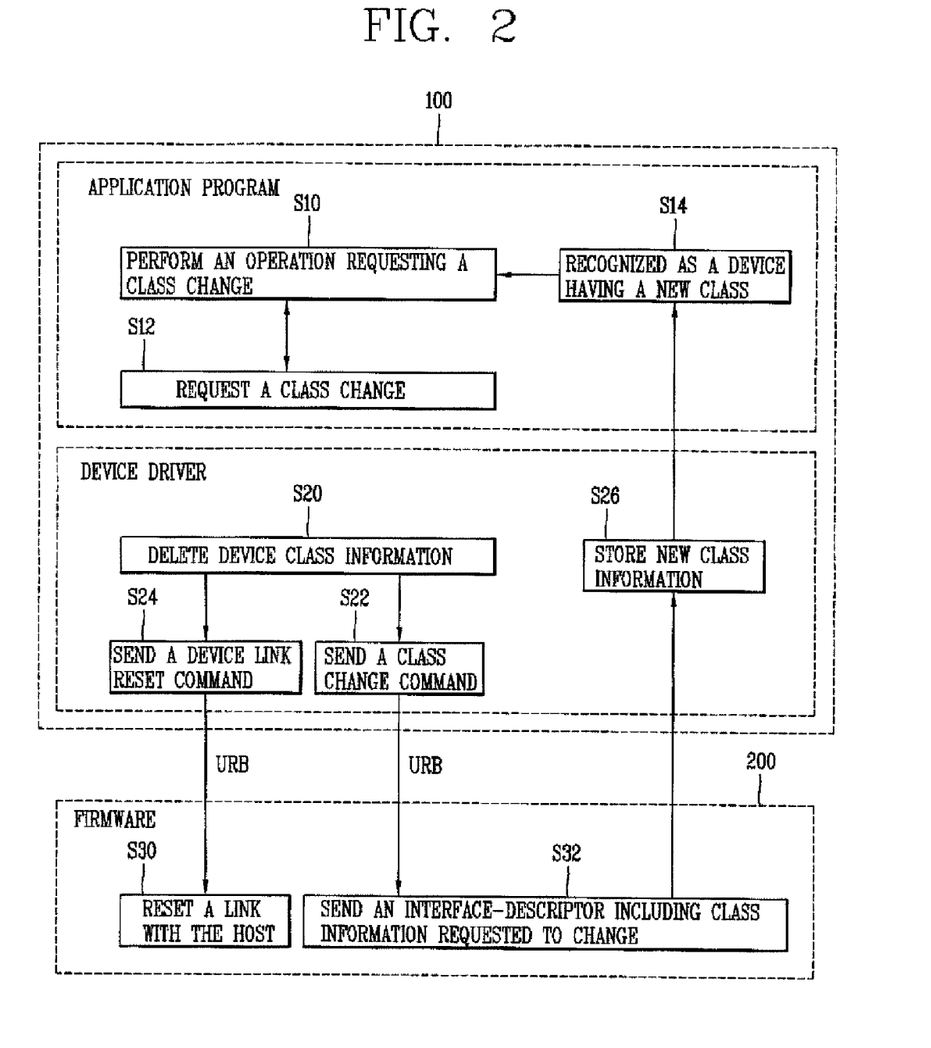
FIG. 2 is a flow chart implementing a process for changing a class of a client apparatus.

Referring to FIG. 2, an application program implemented in the host device 100 first proceeds with a step (S10) of performing an operation requesting a class change.

For example, when a PMP (Portable Multimedia Player) terminal is linked with a computer to receive a file transmission, the PMP terminal is first recognized as Mass Storage Class to communicate with the computer.

In this case, when the PMP receives a command for reproducing a music file stored in the computer the relevant music file should be streaming-transmitted to the PMP terminal, but it is an unsupportable function in the Mass Storage Class.

As a result, when such a command is received, the host device 100 determines that an operation of the step S10 of requesting a class change has been carried out.

The application program that has performed such an operation S10 requests a class change to a device driver for the client device 200 (S12). Such a request in the step S12 will be carried out by an ioctl command.

The device driver of the host device 100 that receives the command deletes the class information for the client device 200 that has been registered in the registry (S20). Here, if the class information is stored in an interface-descriptor, then the interface-descriptor including the relevant information may be deleted.

Furthermore, the device driver transmits a class change command to the client device 200. It may be divided into a step S24 of transmitting a command for resetting a communication-link, and a step S22 of transmitting a class change command including the class information to be changed.

At this implementation, such a command may be transmitted as a URB format to the client device 200. The URB, as an abbreviation of "USB request block," is a data format that is used in transmitting a command or material to a USB client from a USB host.

Furthermore, when the steps S22 and S24 are carried out, the client device 200 receives a command at the relevant step. For a reset command by the step S24, a firmware installed in the client device 200 performs a link reset with the host device as defined in the operating system (S30).

Furthermore, according to the step S22, the client device 200 responds by transmitting data including the class information that has been requested for a change against the received command to the host device 100 (S32).

At this implementation, the data including the class information may be an interface-descriptor including the class information to be changed included in the class change command.

Nevertheless, if it is determined that the class information to be changed included in the class change command is not stored in the memory 23 of the client device 200 at the step S32, in other words, if the relevant class is not supported by the client device 200, then the client device 200 transmits basic class information again to the host device 100.

When the class information to be changed is provided to the host device 100 at the step S32, the host device 100 registers the provided class information in the storage unit 13. At this time, when the class information included in the interface-descriptor is transmitted, the host device 100 registers the transmitted interface-descriptor in the storage unit 13 (S26).

Furthermore, in accordance with the registered content, the host device 100 functions by establishing a communication-link with the client device 200 to transmit and receive data.

Hereinafter, a class changing method will be described. Here, the host device 100 is abbreviated as 'host', and the client device 200 is abbreviated as 'device'.

Figure 3:
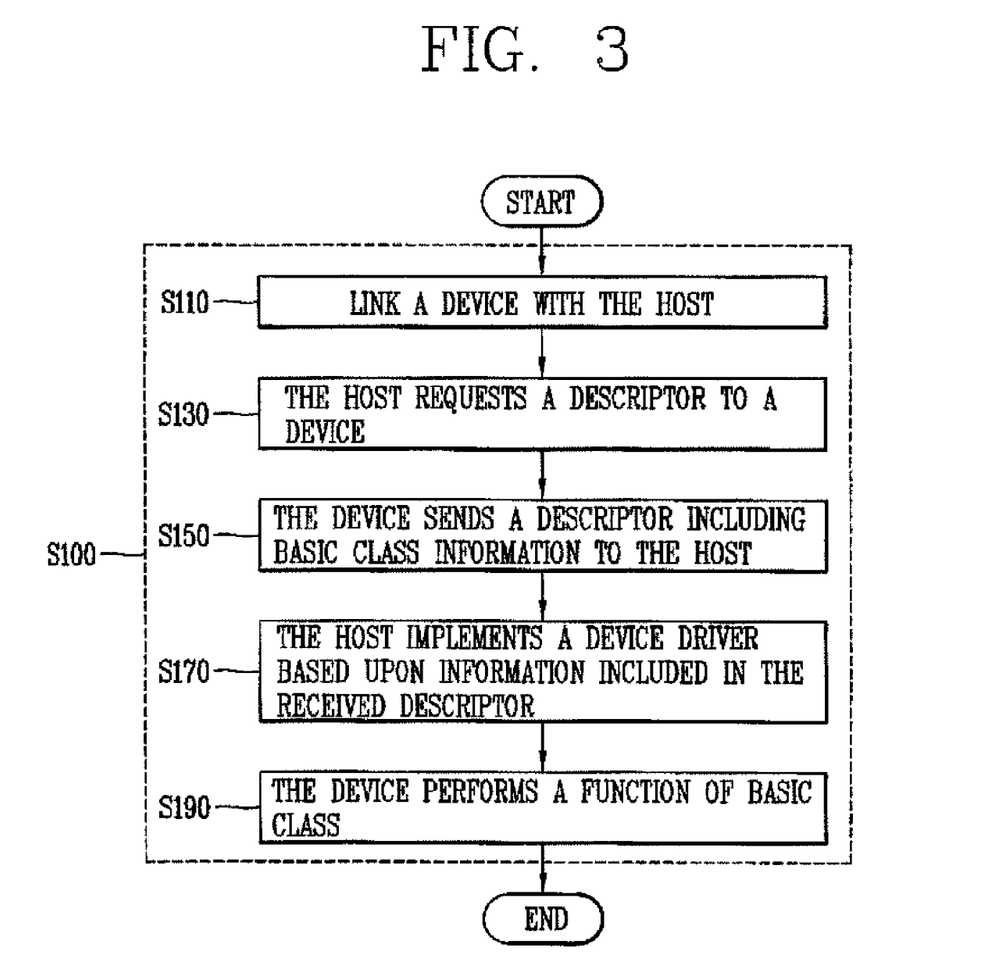
FIG. 3 is a flow chart implementing a process for recognizing a client device by a host device.

First, as shown in FIG. 3, a process in a host device for recognizing a client device begins with a step S110 of linking the client device 200 with the host device 100.

At this time, a process for recognizing the client device 200 by the host device 100 is required to link those two devices in a communicable state, and therefore, here, linking those two devices does not mean a link in a communicable state between those two devices, but a state before performing a recognition process for the client device 200 by the host device 100.

Furthermore, it is performed a step (S130) of requesting apparatus information to the client device 200 by the host device 100. The apparatus information is a device-descriptor as defined in the USB interface standard.

Then, in accordance with a request of the device-descriptor, it is performed a step (S150) of providing a device-descriptor to the host device 100 by the client device 200.

Here, basic class information for the client device 200 is included in the device-descriptor. If the client device 200 is a device supporting at least two classes, then the basic class information is selected and set in advance among the supported classes.

Furthermore, the host device 100 receives the device-descriptor including the class information, and thereby registers the client device 200 in the registry, and performs an appropriate device driver based upon the apparatus information of the client device 200 registered in the registry (S170).

Here, a process for requesting and receiving apparatus information to the client device 200 by the host device 100 to register the information related to the client device 200 is called an enumeration.

Furthermore, in accordance with an operation of the device driver implemented at the step S170, it is performed a process (S190) of carrying out a function to control the client device 200 by the host device 100.

Figure 4:
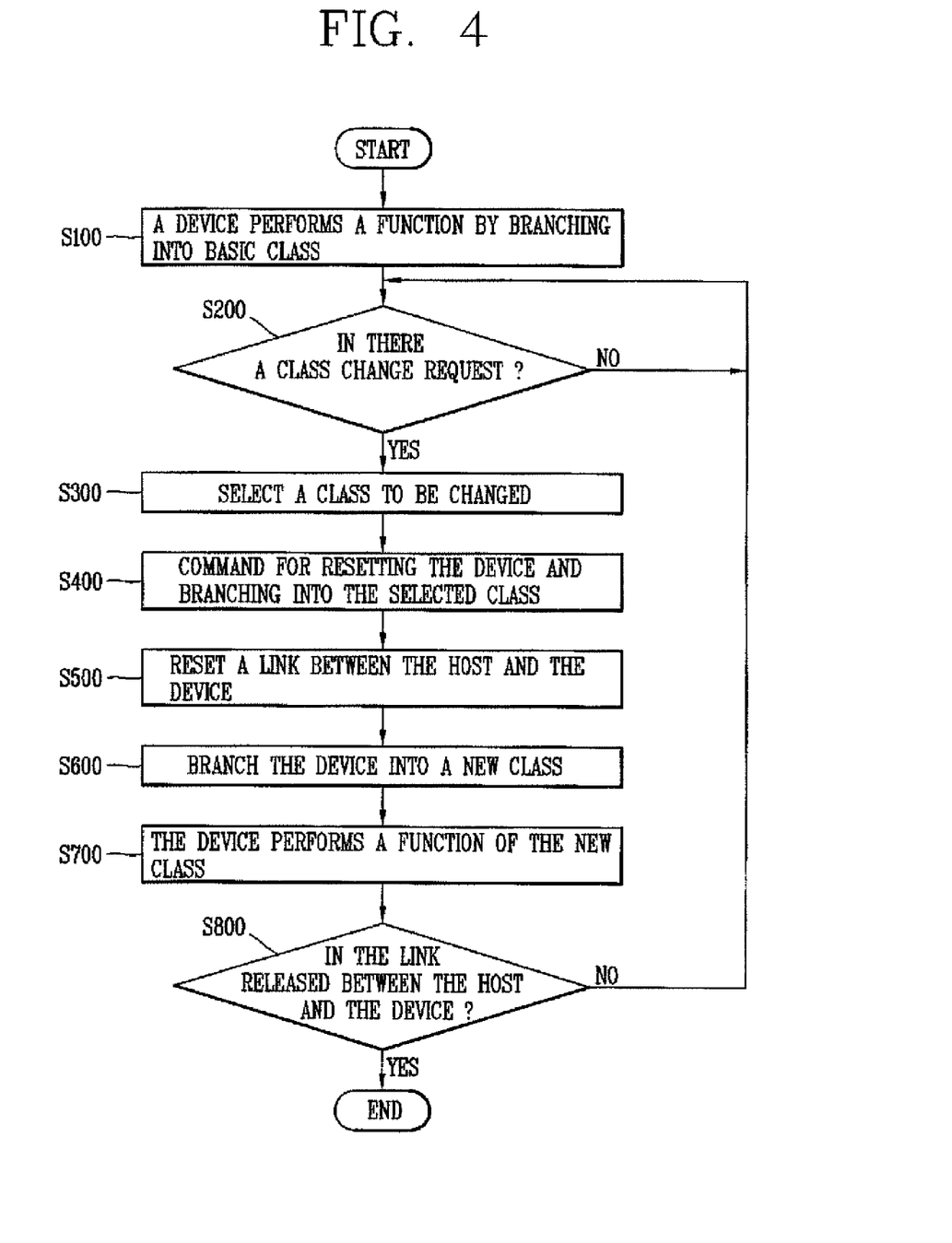
FIG. 4 is a flow chart implementing a process for changing a client device class by a host device.

By putting a series of processes for the steps S110 through S190 which have been performed with reference to FIG. 3 into the step S100, a process of changing a client device class in a host device will be described with reference to FIG. 4.

First, as described above, it is performed a step S100 of establishing a link with the host device 100 by the client device 200 to branch into a prescribed basic class, thereby performing a step S100 of allowing the client device 200 to carry out a function within the first host device 100.

Furthermore, when a class change request is sensed in an application program of the host device 100 while performing the step S100 (S200), the host device 100 selects a class to be changed (S300).

For example, when a command for transmitting video data to a client device 200 is detected while transmitting audio data to the client device registered as Audio Class, the host device 100 selects Video Class as a class to be changed prior to transmitting a class change command to the client device 200.

In addition, by including the selected class information at the step S300, a reset command for a link with the host device 100 and a command for rebranching into the selected class are transmitted to the client device 200 (S400).

When such commands are transmitted at the step S400, the client device 200 resets a link with the host device 100 (S500), and the selected class information at the step S300 is transmitted to the host device 100 to rebranch (S600).

Furthermore, when the host device 100 registers new class information to recognize the client device 200 as a new class, the client device 200 performs a function of the relevant class on the host device 100 (S700).

Furthermore, such an operation can be reiterated until a link between the host device 100 and the client device 200 is released (S800).

Figure 5:
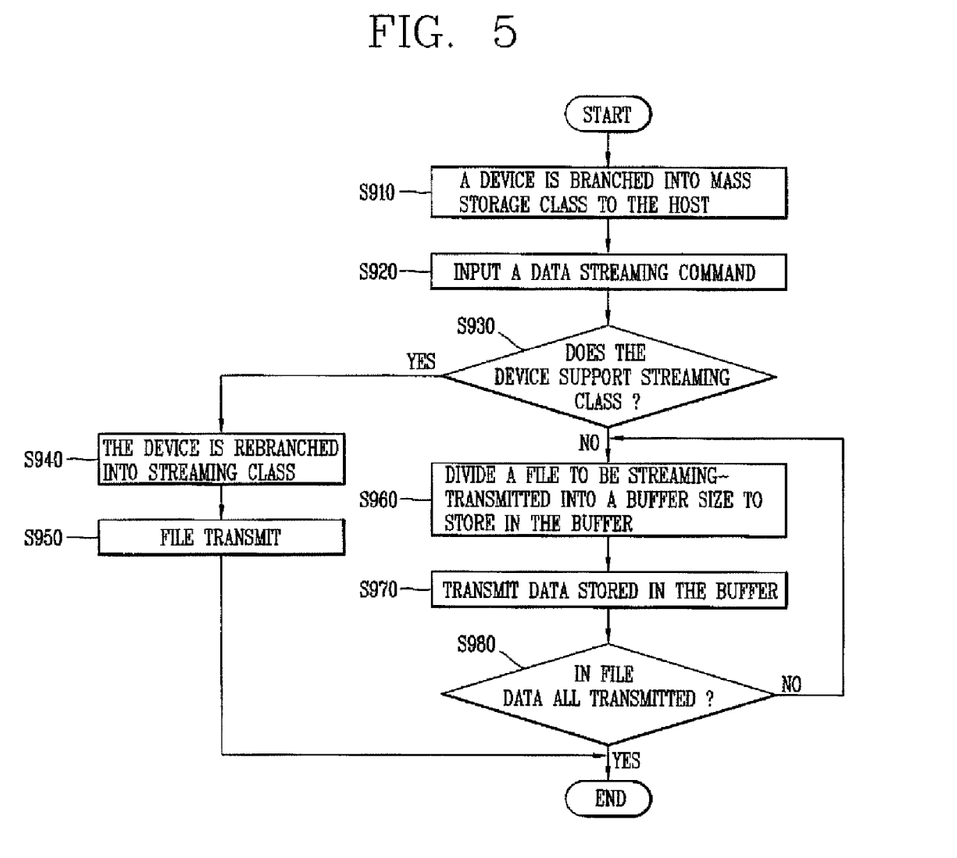
FIG. 5 is a flow chart implementing a process for transmitting a file to a client device class by a host device.

On the other hand, referring to FIG. 5, it begins with a step S910 that the client device 200 supporting Mass Storage Class as a basic class is linked with the host device 100 and recognized.

Furthermore, a step of inputting a data streaming command into the client device 200 while the client device 200 functions as a mass storage in the host device 100 is carried out (S920).

Otherwise, at the step S920, a command for receiving data in a streaming format from the client device 200 to the host device 100 may be provided.

In such a case, the host device 100 performs a step of determining whether or not the client device 200 supports Streaming Class (S930). Such a determination can be accomplished by referring to the information that is provided to the host device 100 by the client device 200.

Otherwise, the host device 100 sends a command for rebranching into Mass Storage Class to the client device 200, but it may be determined that Streaming Class is not supported when the client device 200 has been rebranched into Mass Storage Class.

When it is determined that the client device 200 supports Streaming Class, the client device 200 is rebranched by resetting a link with the host device 100 based upon a class change command of the host device 100 and transmitting Streaming Class information to the host device 100 (S940).

Furthermore, the relevant file is transmitted in a streaming method from the host device 100 to the client device 200, or from the client device 200 to the host device 100, thereby successfully completing all the processes (S950).

On the other hand, if the client device 200 does not support Streaming Class at the step S930, then the host device 100 sequentially divides and stores a file to be streaming-transmitted by fitting into a buffer size in the buffer provided in the host device 100 when transmitting a file to the client device 200 (S960).

At this time, the buffer is provided with a sufficiently small size to transmit data in a similar manner to that of the data transmission in a streaming method.

Furthermore, the data stored in the buffer is transmitted to the client device 200 (S970).

Such steps S960 and S970 are reiterated until the transmission of all file data to be streaming-transmitted is finished (S980).

Such transmission by dividing data into a small size of buffer is to obtain the same effect as the transmission using a streaming method by dividing one file into a plural number to sequentially reproduce them whenever the transmission of each unit is completed, because only a bulk type file transmission is supported in the Mass Storage Class and the file transmitted in a bulk method is reproducible only after the transmission of one file is all completed.

At this time, if a file is transmitted from the client device 200 to the host device 100, then the client device 200 that is provided with a buffer, divides the relevant file by fitting into a buffer size to sequentially transmit the file.

As described above in detail, the following effects may be expected.

That is, a device having at least two classes can be branched into an appropriately selected one class when required.

Furthermore, various functions provided by a device having at least two classes can be all utilized by branching the device having at least two classes into an appropriately selected one class when required.

In addition, a device having at least two classes is registered in a registry as having a required class by branching the device having at least two classes into a selected one class when required, thereby effectively using the registry.

What is claimed is:

1. A class changing apparatus, comprising:
 a link unit configured to be linked with a client device to transmit and receive data;
 a storage unit configured to store apparatus information including class information of the client device; and a control unit coupled to the link unit and the storage unit and configured to:
  detect a data transfer command of an application program while executing the application program, wherein the data transfer command is to transmit data to the client device via the link unit;
  determine whether or not a device class of the client device needs to be changed for transmitting the data based on a transmission method of the data transfer command detected or a type of the data;
  transmit a class change command to the client device through the link unit when the device class of the client device needs to be changed according to the determination, wherein the class change command includes information on a new device class for the data transfer command;
  receive, via the link unit from the client device, a class change request including the information on the new device class; and
  register change to class information stored by the storage unit in response to detecting a class change request.

2. The class changing apparatus of claim 1, wherein the control unit deletes existing class information registered in the storage unit in response to detecting the class change request.

3. The class changing apparatus of claim 1, wherein the link unit is a wired interface including a USB interface.

4. The class changing apparatus of claim 1, wherein the link unit is a wireless device.

5. The class changing apparatus of claim 1, wherein the changed class information is a portion of a device-descriptor.

6. The class changing apparatus of claim 1, wherein the control unit is configured to determine whether or not a device class of the client device needs to be changed for transmitting the data based on the transmission method of the data transfer command detected.

7. The class changing apparatus of claim 1, wherein the control unit is configured to determine whether or not a device class of the client device needs to be changed for transmitting the data based on the type of the data.

8. The class changing apparatus of claim 1, wherein the control unit is configured to detect that the data transfer command involves a streaming type data transfer,
  detect that the device class of the client device is a mass storage class,
  determine that the device class of the client device needs to be changed from the mass storage class to a streaming class based on the detection that the data transfer command involves a streaming type data transfer and the detection that the device class of the client device is the mass storage class, and
  transmit, to the client device through the link unit, a class change command to cause the client device to change from the mass storage class to the streaming class, thereby allowing the streaming type data transfer.

9. A class changing apparatus, comprising:
  a link unit configured to be linked with a client device to transmit and receive data;
  a storage unit configured to store apparatus information including class information of the client device; and
  a control unit coupled to the link unit and the storage unit and configured to:
    detect a data transfer command of an application program while executing the application program, wherein the data transfer command is to transmit data to the client device via the link unit;
    determine whether or not a device class of the client device needs to be changed for transmitting the data based on a transmission method of the data transfer command detected or a type of the data;
    select a new device class for the data transfer command from the class information of the client device when the device class of the client device needs to be changed according to the determination;
    transmit at least one command including a command for rebranching into the selected class to the client device through the link unit;
    receive, via the link unit from the client device, a class change request including the information on the new device class; and
    register class information as changed class information in the storage unit in response to detecting a class change request.

10. The class changing apparatus of claim 9, wherein the control unit deleting existed class information registered in the storage unit in response to detecting the class change request.

11. The class changing apparatus of claim 9, wherein the link unit is a wired interface including a USB interface.

12. The class changing apparatus of claim 9, wherein the changed class information is provided from the client device.

13. The class changing apparatus of claim 9, wherein the at least one command includes a reset command.

14. The class changing apparatus of claim 9, wherein the control unit is configured to determine whether or not a device class of the client device needs to be changed for transmitting the data based on the transmission method of the data transfer command detected.

15. The class changing apparatus of claim 9, wherein the control unit is configured to determine whether or not a device class of the client device needs to be changed for transmitting the data based on the type of the data.

16. The class changing apparatus of claim 9, wherein the control unit is configured to detect that the data transfer command involves a streaming type data transfer, detect that the device class of the client device is a mass storage class, determine that the device class of the client device needs to be changed from the mass storage class to a streaming class based on the detection that the data transfer command involves a streaming type data transfer and the detection that the device class of the client device is the mass storage class, and select the streaming class as the new device class for the data transfer command.

17. A method for changing a device class of a client device, comprising:
  detecting a data transfer command of an application program, wherein the data transfer command is to transmit data to a client device via a link unit, and the link unit is configured to be linked with the client device;
  determining whether or not a device class of the client device needs to be changed for transmitting the data based on a transmission method of the data transfer command detected or a type of the data;
  transmitting a class change command to the client device through the link unit when the device class of the client device needs to be changed according to the determination, wherein the class change command includes information on a new device class for the data transfer command;
  receiving, via the link unit from the client device, a class change request including the information on the new device class; and registering change to class information stored by a storage unit in response to detecting a class change request, wherein the storage unit is configured to store apparatus information including class information of the client device.

18. The method of claim 17, further comprising:

resetting a communication link between a host device and the client device after transmitting the class change command to the client device; and receiving class information from the client device in response to the class change command.

19. The method of claim 17, wherein determining whether or not a device class of the client device needs to be changed for transmitting the data based on the transmission method of the data transfer command detected or the type of the data comprises determining whether or not a device class of the client device needs to be changed for transmitting the data based on the transmission method of the data transfer command detected.

20. The method of claim 17, wherein determining whether or not a device class of the client device needs to be changed for transmitting the data based on the transmission method of the data transfer command detected or the type of the data comprises determining whether or not a device class of the client device needs to be changed for transmitting the data based on the type of the data.

21. The method of claim 17: wherein determining whether or not a device class of the client device needs to be changed for transmitting the data based on the transmission method of the data transfer command detected or the type of the data comprises:

detecting that the data transfer command involves a streaming type data transfer;

detecting that the device class of the client device is a mass storage class; and determining that the device class of the client device needs to be changed from the mass storage class to a streaming class based on the detection that the data transfer command involves a streaming type data transfer and the detection that the device class of the client device is the mass storage class; and wherein transmitting a class change command to the client device through the link unit when the device class of the client device needs to be changed according to the determination comprises transmitting, to the client device through the link unit, a class change command to cause the client device to change from the mass storage class to the streaming class, thereby allowing the streaming type data transfer.

\* \* \* \* \*